(12) United States Patent
Mizumura

(10) Patent No.: US 6,707,991 B2
(45) Date of Patent: Mar. 16, 2004

(54) IMAGE SHAKE PREVENTING APPARATUS

(75) Inventor: Hiroshi Mizumura, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/253,414

(22) Filed: Sep. 25, 2002

(65) Prior Publication Data
US 2003/0063904 A1 Apr. 3, 2003

(30) Foreign Application Priority Data
Sep. 28, 2001 (JP) ........................ 2001-300482

(51) Int. Cl.$^7$ ................................................. G03B 5/00
(52) U.S. Cl. ........................................................ 396/55
(58) Field of Search ...................................... 396/52–55

(56) References Cited
U.S. PATENT DOCUMENTS
6,097,895 A * 8/2000 Furuyama ..................... 396/55

FOREIGN PATENT DOCUMENTS
JP 2001142103 A 5/2001 ............ G03B/5/00

* cited by examiner

Primary Examiner—W. B. Perkey
(74) Attorney, Agent, or Firm—Harness, Dickey & Pierce, P.L.L.C.

(57) ABSTRACT

The image shake preventing apparatus can optimally correct image shake according to an image-taking environment and so on, in which a parameter can be changed for a phase correction circuit which corrects a phase shift of an output signal of an angular velocity sensor for detecting vibration of a camera, and a predetermined parameter can be changed which is used for arithmetic processing when angle information is obtained from the output signal of the angular velocity sensor, so that a frequency range where image shake can be effectively corrected for vibration can be changed. An all-frequency mode, a low-frequency mode, and a high-frequency mode can be selected by a mode setting device. A microcomputer sets a parameter corresponding to a selected mode, so that image shake is effectively corrected at 1 to 10 Hz in the all-frequency mode, image shake is usefully corrected at 0.5 to 3 Hz in the low-frequency mode more effectively than the all-frequency mode, and image shake is usefully corrected at 7 to 30 Hz in the high-frequency mode more effectively than the all-frequency mode.

10 Claims, 3 Drawing Sheets

IMAGE SHAKE PREVENTING APPARATUS

BACKGROUND OF THE INVENTION

1. Field of the Invention

The present invention relates to an image shake preventing apparatus and particularly concerns an image shake preventing apparatus which can prevent image shake on a camera caused by vibration.

2. Description of the Related Art

In the conventional image shake preventing apparatus (vibration isolator) for an image-taking optical system of a television camera, a correcting lens for isolating vibration is movably placed in a plane orthogonal to the optical axis, and when vibration is applied on the camera (the image-taking optical system of the camera), the correcting lens is moved by an actuator in a direction for canceling out the vibration so as to correct the image shake. Japanese Patent Application Publication No. 2001-142103 discloses that vibration applied on a camera is detected as, for example, a detection signal of a shake detecting sensor (such as an angular speed sensor and an acceleration sensor or the like), which is inputted to an arithmetic part (microcomputer) via a sensor amplifier, and digital arithmetic processing such as integration is then performed on the detection signal in the microcomputer to find a correction value (displacement position or the like of the correcting lens) for correcting image shake.

The shake detecting sensor, the sensor amplifier, and the digital arithmetic processing in the microcomputer respectively have frequency characteristics. For example, in the shake detecting sensor, a detection signal is delayed in phase as the frequency rises. The sensor amplifier hence includes a phase correction circuit for correcting the delay. However, even if the phase correction circuit is mounted, it is difficult to perform perfect correction over all frequencies. Conventionally, a set value of a predetermined parameter for changing the frequency characteristic of the phase correction circuit is set, for example, at a value permitting a phase to be effectively corrected in a range of about 1 to 10 Hz. The value is set so as to effectively correct image shake in a frequency range regarded as a frequency range of typical vibration, which is likely to occur in a number of image-taking environments. The frequency range where the phase is effectively corrected can be changed by changing the set value of the parameter.

Further, as to the digital arithmetic processing in the microcomputer, a frequency range for obtaining an effective arithmetic result is limited, and the frequency range can be also changed according to a change in the set value of the prescribed parameter used for the arithmetic processing. Conventionally, such a parameter of the digital arithmetic processing is set so as to effectively perform the arithmetic processing in the frequency range of 1 to 10 Hz.

However, even when the value of the parameter is set so as to effectively correct image shake in the frequency range of 1 to 10 Hz as in the case of prior art, exclusively for frequency ranges around thresholds in the range of 1 to 10 Hz (around 1 Hz or 10 Hz), it is possible to set a parameter value for making more effective correction. Therefore, the frequency ranges around the thresholds cannot be optimally set by the conventional setting of the parameter. If frequencies of vibration may widely range from 1 to 10 Hz, it is the most suitable to set a parameter which can effectively make correction over the range of 1 to 10 Hz. In contrast, when most frequencies of vibration are limited to frequencies around 1 Hz or 10 Hz, the above-described setting of the parameter cannot be the most suitable. Further, in some cases, vibration may occur with a lower frequency or a higher frequency than the frequency range of 1 to 10 Hz. In this case, it is not possible to properly prevent image shake.

Since the image-taking environment of a camera is unknown at the time of shipping a product, the tendency of vibration cannot be specified. However, when pictures are actually taken, the tendency of vibration can be somewhat predicted from the image-taking environment. For example, when a camera is set on a hard ground, vibration of a high-frequency range is more likely to occur. On the other hand, when a camera is set on a soft ground, vibration of a low-frequency range is more likely to occur. Moreover, also in the case where a camera is mounted on a vehicle or used for broadcast on a helicopter, the frequency of vibration can be somewhat limited. Meanwhile, even when the tendency of vibration cannot be predicted from the image-taking environment, the state of a taken image is observed while actually changing a parameter, so that an optimum parameter can be specified.

SUMMARY OF THE INVENTION

The present invention has been achieved in view of the above-described circumstances and has as its object the provision of an image shake preventing apparatus which can optimally correct image shake in accordance with an image-taking environment, that is, the frequency tendency of vibration occurring on the camera.

In order to attain the above-described object, the present invention is directed to an image shake preventing apparatus, comprising: an image shake correction value obtaining device which detects vibration occurring on an image-taking optical system and obtains a correction value for correcting image shake according to the detected vibration, wherein a frequency range of the vibration where the image shake is effectively corrected by using the obtained correction value depends upon a set value of a predetermined parameter; an image shake correcting device which corrects the image shake according to the correction value obtained by the image shake correction value obtaining device; and a parameter changing device which changes the set value of the parameter in the image shake correction value obtaining device.

Preferably, the parameter changing device sets one of an all-frequency set value, a low-frequency set value, and a high-frequency set value effectively correcting image shake on vibration of all frequencies, low frequencies, and high frequencies, respectively, in a predetermined frequency range as a set value of the parameter.

Preferably, the parameter changing device sets a set value corresponding to a mode selected by a mode setting device, as a set value of the parameter.

Preferably, the parameter is used in one of signal processing and arithmetic processing for obtaining the correction value, and is related to a frequency of vibration.

According to the present invention, the set value of the predetermined parameter related to a frequency can be changed so as to change a frequency range of vibration where image shake can be effectively corrected. Thus, it is possible to optimally correct image shake according to an image-taking environment and so on.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of an image shake correcting device according to the present invention will be discussed below in accordance with the accompanied drawings.

Figure 1:
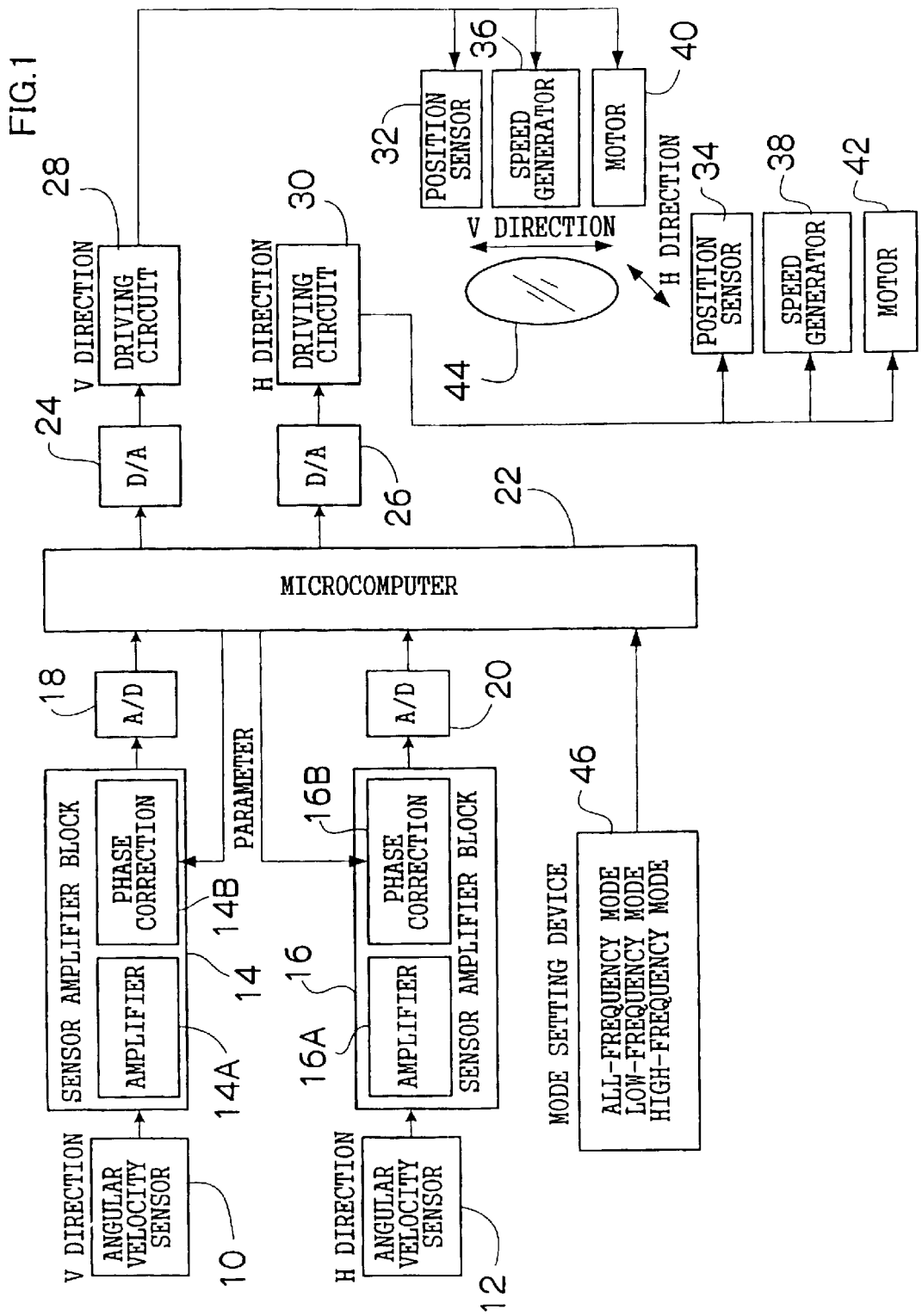
FIG. 1 is a block diagram showing a configuration of an image shake preventing apparatus according to the present invention.

FIG. 1 is a block diagram showing a configuration of the image correcting device according to an embodiment of the present invention. Angular velocity sensors 10 and 12 in FIG. 1 are respectively placed in a lens device or a camera body that constitutes a television camera (hereinafter, referred to as a camera), and the sensors 10 and 12 detect vibration in a vertical (perpendicular) direction (hereinafter, referred to as V direction) and vibration in a lateral (horizontal) direction (hereinafter, referred to as H direction), respectively, on the camera as angular velocity information of the V direction and the H direction. Shake detecting sensors for detecting vibration are not limited to the angular velocity sensor, and other kinds of sensors such as an acceleration sensor are also applicable. Meanwhile, a correcting lens 44 in FIG. 1 is placed on an optical path in an image-taking optical system of the camera, is driven in the V direction by a motor 40, and is driven in the H direction by a motor 42. When vibration occurs on the camera, the correcting lens 44 is displaced in the V direction and the H direction by the motors 40 and 42 so as to cancel out the vibration, and the optical axis direction of the image-taking optical system is fine-tuned so as to prevent image shake. Additionally, since the present device is constituted by a pair of circuits for performing the same processing on vibration in the V direction and the H direction, in order to avoid redundant explanation, the following will mainly discuss the circuit and the processing of the V direction. The circuit of the H direction will be represented by reference numerals in parentheses following reference numerals of the circuit of the V direction, and the explanation of the processing is omitted.

When vibration occurs in the V direction (or the H direction) on the camera, an angular velocity signal representing the magnitude and the direction of an angular velocity is outputted from the above-described angular velocity sensor 10 (12) as angular velocity information of the vibration, and the signal is inputted to a sensor amplifier block 14 (16). An amplifier circuit 14A (16A) and a phase correction circuit 14B (16B) are mounted in the sensor amplifier block 14 (16). The angular velocity signal inputted to the sensor amplifier block 14 (16) is amplified by the amplifier circuit 14A (16A), and then, the signal is corrected in phase by the phase correction circuit 14B (16B). Normally, the angular velocity signal outputted from the angular velocity sensor 10 (12) is likely to be delayed in phase as vibration appearing on the camera (hereinafter, simply referred to as vibration) increases in frequency. Thus, the angular velocity signal is displaced in phase for each frequency component included in the vibration, and the phase shift for each frequency component is corrected by phase correction of the phase correction circuit 14B (16B). Further, in the phase correction circuit 14B (16B), it is difficult to simultaneously correct phase shifts of all frequency ranges, and frequencies effectively corrected by the phase correction circuit 14B (16B) are limited to some ranges. In the phase correction circuit 14B (16B), a circuit constant (parameter) for advancing a phase can be changed by an analog switch or a digital potentiometer, so that frequency ranges to be effectively corrected can be changed accordingly. In the present embodiment, a set value specified by a microcomputer 22 is set as a set value of a parameter of the phase correction circuit 14B (16B). The setting of the parameter will be discussed later.

The angular velocity signal processed by the sensor amplifier block 14 (16) is converted into a digital signal by an A/D converter 18 (20) and then inputted to the microcomputer 22. The angular velocity signal inputted to the microcomputer 22 is converted into angle information by digital arithmetic processing of the microcomputer 22. As the digital arithmetic processing of the microcomputer 22, kinds of processing are performed that include noise removing processing for removing noise included in the angular velocity signal, and phase correction processing for correcting phase shift by digital processing as in the case of the phase correction circuit 14B (16B), in addition to digital integration processing for performing digital integration on the angular velocity signal to convert the signal into an angular signal. Hereinafter, all kinds of arithmetic processing for obtaining angle information will be referred to as angle arithmetic.

Further, each of the digital integration processing, the noise removing processing, and the phase correction processing in the angle arithmetic has a parameter related to a frequency. The values of the parameters are changed, so that a frequency range where arithmetic processing can be effectively performed is changed accordingly, as in the case of the parameter set in the phase correction circuit 14B (16B). The values of the parameters are set according to the setting of frequency modes, which will be discussed later. The setting of the parameters will be discussed in detail later.

Angle information obtained by the arithmetic processing of the microcomputer 22 corresponds to information representing a position of the correcting lens 44 for correcting image shake caused by vibration. The angle information outputted from the microcomputer 22 is converted into an analog signal by a D/A converter 24 (26) and is then inputted to a driving circuit 28 (30). To the driving circuit 28 (30), a position signal representing a current position of the correcting lens 44 in the V direction (or the H direction) is inputted from a position sensor 32 (34), and a velocity signal representing a current moving speed of the correcting lens 44 in the V direction (or the H direction) is inputted from a speed generator 36 (38). The driving circuit 28 (30) drives the motor 40 (42) while referring to the position signal and the velocity signal such that the correcting lens 44 is set on a position corresponding to the angle information. Thus, the correcting lens 44 is displaced to a position on which image shake caused by vibration appearing on the camera is prevented, thereby preventing image shake.

The above-described embodiment discussed the case where the correcting lens 44 is displaced in the V direction and the H direction to correct image shake. The present invention is applicable even when the configuration for correcting image shake is different from that of the above-described embodiment. Moreover, the above-described embodiment discussed the case where the microcomputer 22 computes angle information as a correction value for correcting image shake. The present invention is applicable even when another value is computed as a correction value.

Next, the following will discuss the setting of parameters in the microcomputer 22. As described above, the parameters set in the microcomputer 22 include a parameter for advancing a phase (hereinafter, referred to as a parameter for the phase correction circuit) in the phase correction circuit 14B (16B) of the sensor amplifier block 14 (16) and parameters that are used for processing such as the digital integration processing, the noise removing processing, and the phase correction processing in the angle arithmetic of the microcomputer 22 and are related to frequencies (hereinafter, the parameter used for the angle arithmetic of the microcomputer 22 will be referred to as a parameter for the angle arithmetic). The set values of the parameters are determined by the microcomputer 22 according to frequency modes selected by the user employing a mode setting device 46.

The mode setting device 46 is constituted by, for example, a switching member operatable by the user, and modes selected by the mode setting device 46 include an all-frequency mode, a low-frequency mode, and a high-frequency mode. These modes are used for setting a frequency range where image shake can be effectively corrected for vibration appearing on the camera. Hereinafter, the frequency range will be referred to as an effective correction range.

The all-frequency mode indicates a mode in which the substantially all of the frequency ranges of typical vibration appearing on the camera are used as the effective correction range. The low-frequency mode indicates a mode in which a low-frequency range is used as the effective correction range in the frequency ranges of typical vibration appearing on the camera. The high-frequency mode indicates a mode in which a high-frequency range is used as the effective correction range in the frequency ranges of typical vibration appearing on the camera.

A mode selected in the mode setting device 46 is read by the microcomputer 22, and a set value of the parameter for the phase correction circuit and a set value of the parameter for angle arithmetic are determined so as to correspond to the selected mode in the microcomputer 22. For example, when the all-frequency mode is selected, the parameter for the phase correction circuit is determined at a set value permitting a phase to be effectively corrected within the effective correction range of the all-frequency mode, and the set value of the parameter for the angle arithmetic is determined at a set value permitting kinds of arithmetic to be effectively performed in the effective correction range of the all-frequency mode.

The set value of the parameter for the phase correction circuit that is determined by the microcomputer 22 is supplied to the phase correction circuit 14B (16B) from the microcomputer 22, and the set value is set as a set value of the parameter used in the phase correction circuit 14B (16B). Meanwhile, the set value of the parameter for the angle arithmetic that is determined by the microcomputer 22 is used as a set value of the parameter for kinds of arithmetic during the angle arithmetic performed in the microcomputer 22.

Figure 2:
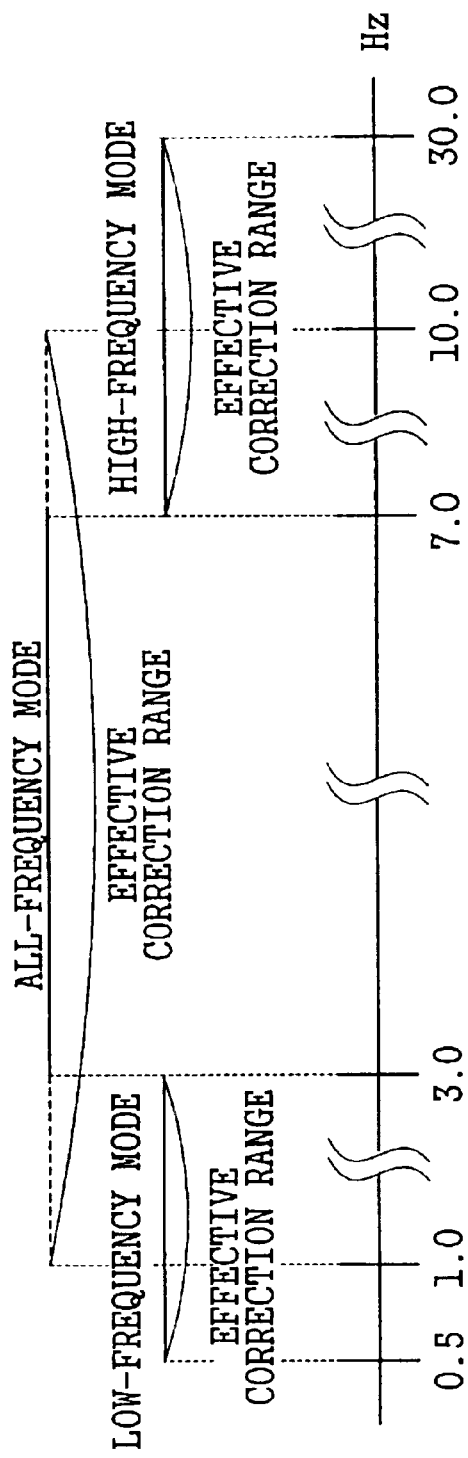
FIG. 2 is a diagram showing an example of an effective correction range of each of frequency modes.

FIG. 2 is a diagram showing an example of the effective correction ranges of the modes. Referring to FIG. 2, comparison will be made on the effects of the modes. It is considered that typical vibration appearing on the camera has a frequency range of about 1 to 10 Hz. As shown in FIG. 2, an effective correction range is provided over the full ranges in the all-frequency mode. In contrast, in the low-frequency mode, an effective correction range is about 1 to 3 Hz and a lower-frequency range of 0.5 to 1 Hz is also used as an effective correction range for the set values of the parameters. Namely, the low-frequency mode has the effective correction range of 0.5 to 3 Hz. Meanwhile, in the high-frequency mode, an effective correction range is about 7 to 10 Hz and a higher-frequency range of 10 to 30 Hz is also used as an effective correction range for the set values of the parameters. Namely, the high-frequency mode has the effective correction range of 7 to 30 Hz.

Moreover, from 1 to 3 Hz, either the all-frequency mode or the low-frequency mode has the effective correction range and image shake is effectively corrected. However, in this range, image shake is corrected more effectively in the low-frequency mode. Namely, in the all-frequency mode, the set value of the parameter is set so as to preferably correct vibration mainly appearing at midrange frequencies in the frequency range of 1 to 10 Hz, so that correction is effective over the range of 1 to 10 Hz at the set value of the parameter; hence, the set value of the parameter cannot be optimum exclusively at low frequencies. In contrast, in the low-frequency mode, since the set value of the parameter is set so as to be optimum at low frequencies, the effective correction range is limited to low frequencies. However, more effective (preferable) correction can be made in this range. Therefore, in an image-taking environment where frequencies of vibration are limited to low frequencies, it is proper to select the low-frequency mode.

Similarly, from 7 to 10 Hz, either the all-frequency mode or the high-frequency mode has the effective correction range and image shake can be effectively corrected. In this range, image shake is corrected more effectively in the high-frequency mode. Therefore, in an image-taking environment where frequencies of vibration are limited to high frequencies, it is proper to select the high-frequency mode.

A typical frequency range appearing on the camera can be divided into low frequencies, midrange frequencies, and high frequencies. Although the all-frequency mode is a mode where image shake is corrected more effectively than the other modes at the midrange frequencies, when a set value of a parameter is available for performing correction more effectively than the all-frequency mode exclusively at midrange frequencies (e.g., 3 to 7 Hz), a midrange-frequency mode for setting the set value of the parameter may be provided as a selectable mode. Further, although the midrange-frequency mode may be provided instead of the all-frequency mode, when frequencies of vibration cannot be predicted, the all-frequency mode is advantageous in that image shake is effectively corrected at least over the typical frequency range appearing on the camera. Thus, it is proper to provide the all-frequency mode as a selectable mode.

Figure 3:
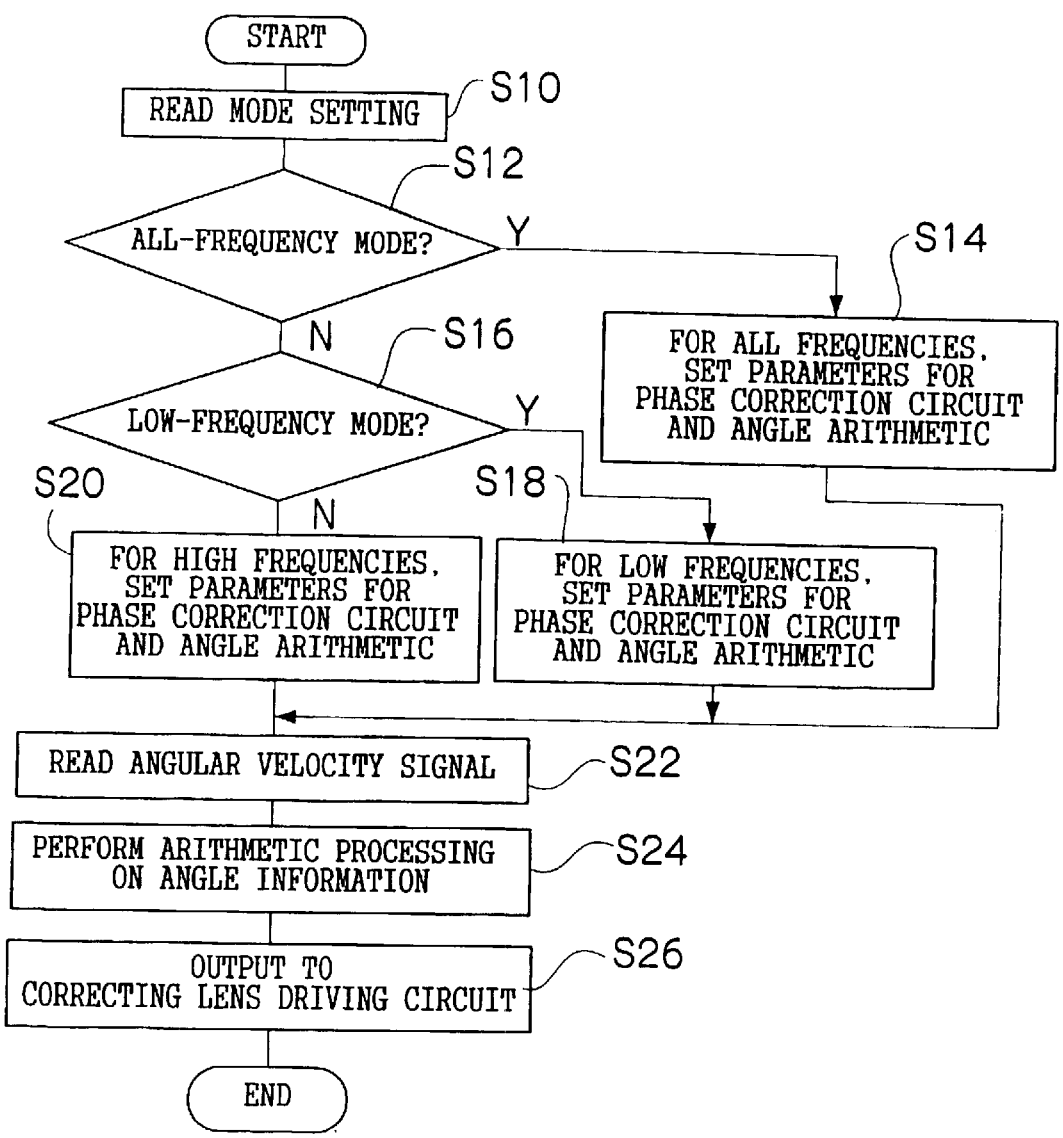
FIG. 3 is a flowchart showing a processing step of a microcomputer.

The following will discuss a processing procedure of the microcomputer 22 in accordance with a flowchart of FIG. 3. First, the microcomputer 22 reads a selected mode from the mode setting device 46 (step S10). Then, the microcomputer 22 judges whether the all-frequency mode is selected or not (step S12). When YES is judged, the parameter for the phase correction circuit that is specified for the phase correction circuit 14B (16B) and the parameter for the angle arithmetic that is used for the angle arithmetic, are set at the set values of all frequencies (step S14).

Meanwhile, when NO is judged in the step S12, it is judged whether the low-frequency mode is selected or not (step S16). When YES is judged, the parameter for the phase correction circuit that is specified for the phase correction circuit 14B (16B) and the parameter for the angle arithmetic that is used for the angle arithmetic are set at the set values of low frequencies (step S18).

Meanwhile, when NO is judged in the step S16, since it is judged that the high-frequency mode is selected, the parameter for the phase correction circuit that is specified for the phase correction circuit 14B (16B) and the parameter for the angle arithmetic that is used for the angle arithmetic are set at the set values of high frequencies (step S18).

When the setting of each of the parameters is completed, the microcomputer 22 subsequently reads an angular velocity signal through the angular velocity sensor 10 (12), the sensor amplifier block 14 (16), and so on (step S22), and angle information is computed from the angular velocity signal by the angle arithmetic (step S24). Then, the angle information computed by the angle arithmetic is outputted to the driving circuit 28 (30) for driving the correcting lens 44 by using the motor 40 (42) (step S26).

In the above-described embodiment, the parameter for the phase correction circuit and the parameter for the angle arithmetic can be changed among three kinds of set values of all frequencies, low frequencies, and high frequencies. The parameters are not limited to the above values and may be changed to more set values. Moreover, the set values of the parameters may be changed to consecutive values.

As described above, according to the image shake preventing apparatus of the present invention, the set values of predetermined parameters related to frequencies can be changed so as to change the vibration frequency range where image shake can be effectively corrected. Thus, it is possible to optimally correct image shake in accordance with the image-taking environment and so on.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image shake preventing apparatus, comprising:
   an image shake correction value obtaining device which detects vibration occurring on an image-taking optical system and obtains a correction value for correcting image shake according to the detected vibration, wherein a frequency range of the vibration where the image shake is effectively corrected by using the obtained correction value depends upon a set value of a predetermined parameter;
   an image shake correcting device which corrects the image shake according to the correction value obtained by the image shake correction value obtaining device; and
   a parameter changing device which changes the set value of the parameter in the image shake correction value obtaining device, wherein the parameter is used in one of signal processing and arithmetic processing for obtaining the correction value, and is related to a frequency of vibration.

2. The image shake preventing apparatus according to claim 1, wherein the parameter changing device sets a set value corresponding to a mode selected by a mode setting device, as a set value of the parameter.

3. The image shake preventing apparatus according to claim 1, wherein the parameter changing device sets one of an all-frequency set value, a low-frequency set value, and a high-frequency set value effectively correcting image shake on vibration of all frequencies, low frequencies, and high frequencies, respectively, in a predetermined frequency range as a set value of the parameter.

4. The image shake preventing apparatus according to claim 3, wherein the parameter changing device sets a set value corresponding to a mode selected by a mode setting device, as a set value of the parameter.

5. A camera comprising the image-taking optical system and the image shake preventing apparatus of claim 1.

6. An image shake preventing apparatus, comprising:
   image shake correction value obtaining means for detecting vibration occurring on an image-taking optical system and for obtaining a correction value for correcting image shake according to the detected vibration, wherein a frequency range of the vibration where the image shake is effectively corrected by using the obtained correction value depends upon a set value of a predetermined parameter;
   image shake correcting means for correcting the image shake according to the correction value obtained by the image shake correction value obtaining means; and
   parameter changing means for changing the set value of the parameter in the image shake correction value obtaining means, wherein the parameter is used in one of signal processing and arithmetic processing for obtaining the correction value, and is related to a frequency of vibration.

7. The image shake preventing apparatus according to claim 6, wherein the parameter changing means is for setting a set value corresponding to a mode selected by a mode setting means, as a set value of the parameter.

8. The image shake preventing apparatus according to claim 6, wherein the parameter changing means is for setting one of an all-frequency set value, a low-frequency set value, and a high-frequency set value effectively correcting image shake on vibration of all frequencies, low frequencies, and high frequencies, respectively, in a predetermined frequency range as a set value of the parameter.

9. The image shake preventing apparatus according to claim 8, wherein the parameter changing means is for setting a set value corresponding to a mode selected by a mode setting means, as a set value of the parameter.

10. A camera comprising the image-taking optical system and the image shake preventing apparatus of claim 6.

* * * * *